March 20, 1934.  J. SCHAEFER  1,951,996
BREWING PAN
Filed May 4, 1933   3 Sheets-Sheet 1

Inventor:
Josef Schaefer,
by Attorney.

March 20, 1934. J. SCHAEFER 1,951,996
BREWING PAN
Filed May 4, 1933 3 Sheets-Sheet 2
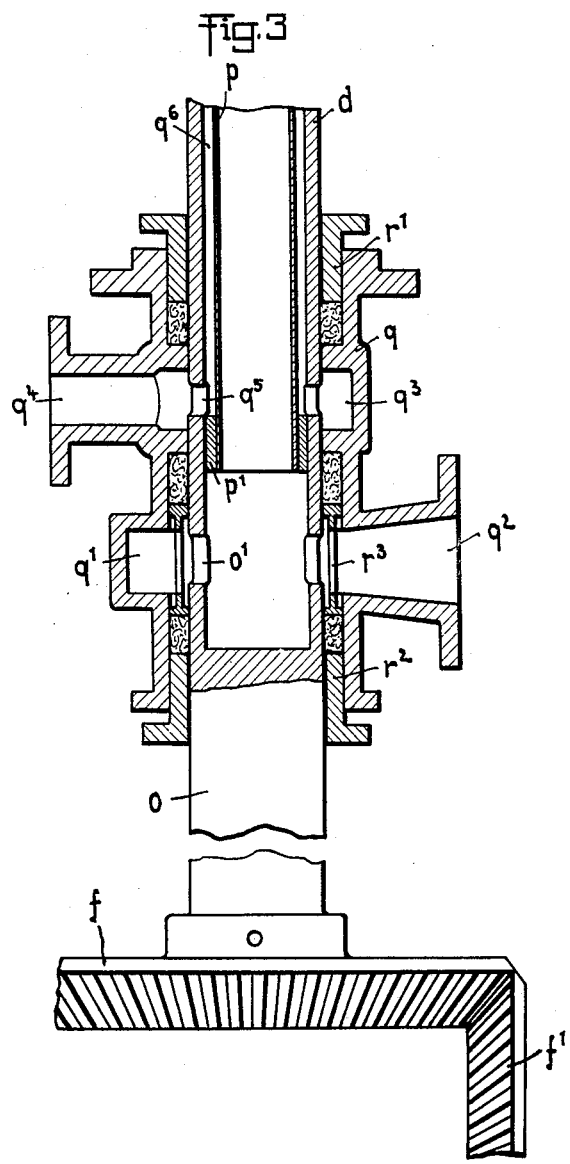
Inventor,
Josef Schaefer,
by F. W. Dohm,
Attorney.

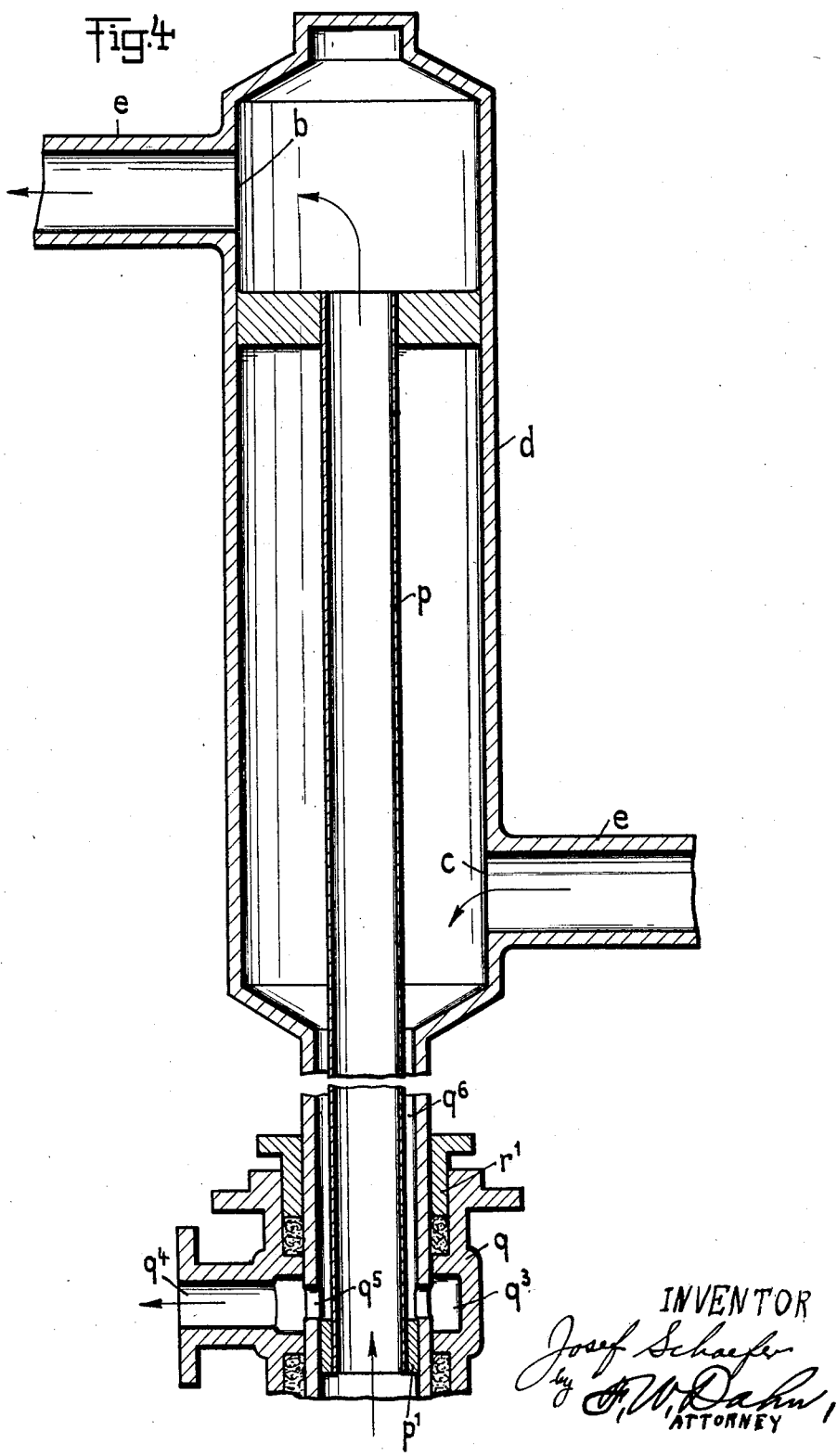

Patented Mar. 20, 1934

1,951,996

UNITED STATES PATENT OFFICE 1,951,996

BREWING PAN

Josef Schaefer, Brunswick, Germany, assignor to "Miag" Muhlenbau und Industrie Aktiengesellschaft, Brunswick, Germany Application May 4, 1933, Serial No. 669,437
In Germany June 5, 1930

4 Claims. (Cl. 257—104)

My invention relates to improvements in brewing pans, and more particularly in the construction of the rotary liquid heater. One of the objects of the improvements is to provide a liquid heater which is simple in construction, and in which the water of condensation is readily removed from the heating coil. With this object in view my invention consists in providing the liquid heater with a single heating pipe wound into a coil having several superposed windings, each winding being preferably substantially in the form of a star. By constructing the coil from a single pipe only two openings are needed in the supply one for admitting the steam and the other for removing the water of condensation.

Figure 1:
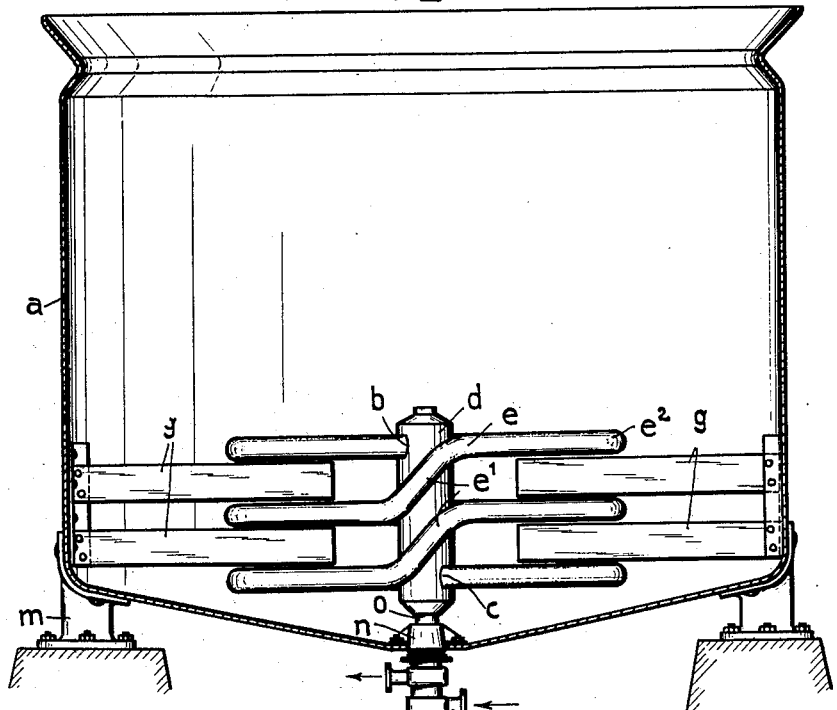
Figure 2:
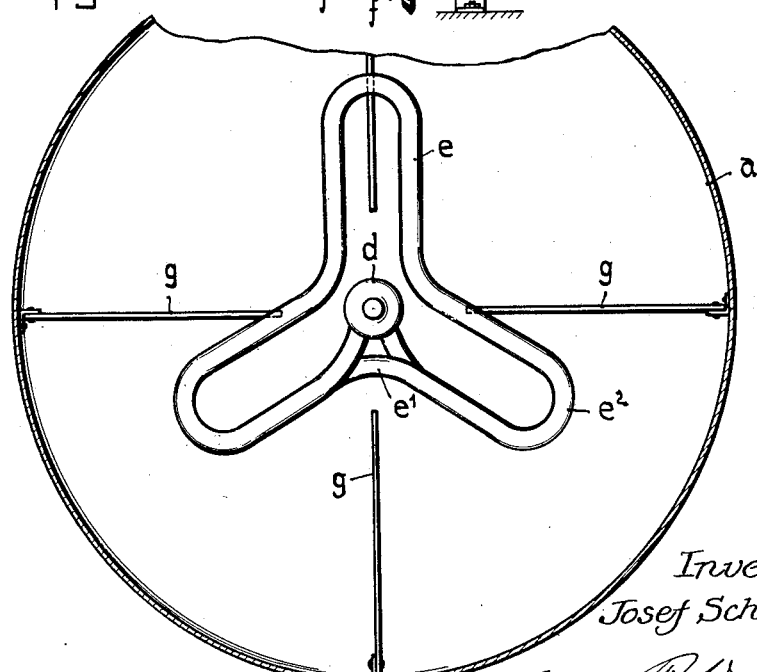

For the purpose of explaining the invention an example embodying the same has been shown in the accompanying drawings in which the same reference characters have been used in all the views to indicate corresponding parts. In said drawings, Fig. 1 is an elevation showing the pan in section, Fig. 2 is a broken top plan view of Fig. 1, Fig. 3 is a sectional detail view showing a part of the liquid heater, and Fig. 4, a vertical section of parts shown in Fig. 1.

The brewing pan $a$ is supported on a suitable foundation by means of legs $m$. Within the pan there is a rotary liquid heater comprising a tubular body $d$ rotatably mounted in a bushing $n$ fixed to and extending through the bottom of the pan $a$. As is shown in Fig. 3 the tubular body $d$ comprises a shaft $o$ which is tubular at its top end and which encloses a concentric pipe $p$ which is fixed at its bottom end to the tubular part of the shaft $o$ in a steam-tight manner by means of a ring $p^1$.

The shaft $o$ is passed through a tubular body $q$ which is formed at its bottom end with an annular chamber $q^1$ connected with an intake $q^2$ for the steam and communicating with the tubular part of the shaft $o$ and the pipe $p$ through slots $o^1$. Further, the tubular body $q$ is formed near its top end with an annular chamber $q^3$ connected with a tubular stud $q^4$ and communicating through slots $q^5$ with an annular passage $q^6$ provided between the tubular part of the shaft $o$ and the pipe $p$. The shaft $o$ is guided within the tubular body $q$ in a steam-tight manner by means of stuffing boxes $r^1$ and $r^2$, the stuffing box $r^2$ comprising a slotted ring $r^3$. To the bottom end of the shaft $o$ a bevelled gearing $f$ is keyed which is in mesh with a bevelled gearing $f^1$ secured to a driving shaft $h$.

On the tubular body $q$ a coiled pipe $e$ is mounted which is connected at its top end at $b$ to the pipe $p$ and at its bottom end at $c$ with the tubular part of the shaft $o$ and the annular passage $q^6$. The coil is made from a single pipe which is wound around the tubular body $q$ in several windings. Preferably each winding takes the form of a star, as is shown in Fig. 2.

To the inner wall of the pan $a$ radial arms $q$ are secured the free ends of which are located between the windings of the coil, and which are adapted to strip solid particles from the coil which may be deposited thereon, thus preventing burning of the said particles and insuring intimate mixing and uniform boiling of the matter within the pan. In order to prevent interference of the arms $q$ with the rotatable coil $e$ the windings of the coil are formed with inner cranked portions $e^1$ and outer horizontal portions $e^2$, so that the arms $g$ may freely pass between the windings.

I claim:

1. The herein described apparatus, comprising a pan, a rotary liquid heater within said pan, comprising a pipe wound into a coil having several superposed star-shaped windings, means to supply a heating fluid to one end of said pipe, and means connected with the other end of said pipe for removing the heating fluid therefrom.

2. The herein described apparatus, comprising a pan, a rotary liquid heater within said pan, comprising a pipe wound into a coil having several superposed star-shaped windings, means to supply a heating fluid to one end of said pipe, means connected with the other end of said pipe for removing the heating fluid therefrom, and arms secured to the pan and extending between said windings, said windings being provided near the axis of rotation with bevelled portions and with outer portions located in planes perpendicular to the axis of rotation.

3. The herein described apparatus, comprising a receptacle, a rotary liquid heater within said receptacle, said heater including a pipe coiled to provide superposed spaced star-shaped convolutions connected at points adjacent the center of revolution by similarly inclined portions of the pipe whereby rotation of the heater aids the upward movement of the heated liquid adjacent to such center of revolution, and inlet and outlet means for circulating heating fluid through said pipe.

4. In a device of the character described, a receptacle, a rotary heating coil comprising superposed star-shaped convolutions connected adjacent the center of revolution, the points of the star radiating from the center of rotation and each point constituting an independent stirrer for the liquid, the inner parts of said convolutions aiding in the upward movement of the adjacent liquid in the receptacle, and inlet and outlet means for circulating heating fluid through said pipe.

JOSEF SCHAEFER.